Nov. 18, 1930.                R. BRENCHLEY                1,781,679
                                PHONOGRAPH
                            Filed Jan. 4. 1927          2 Sheets-Sheet 1

INVENTOR
Richard Brenchley
BY
Robert W Byerly
ATTORNEY

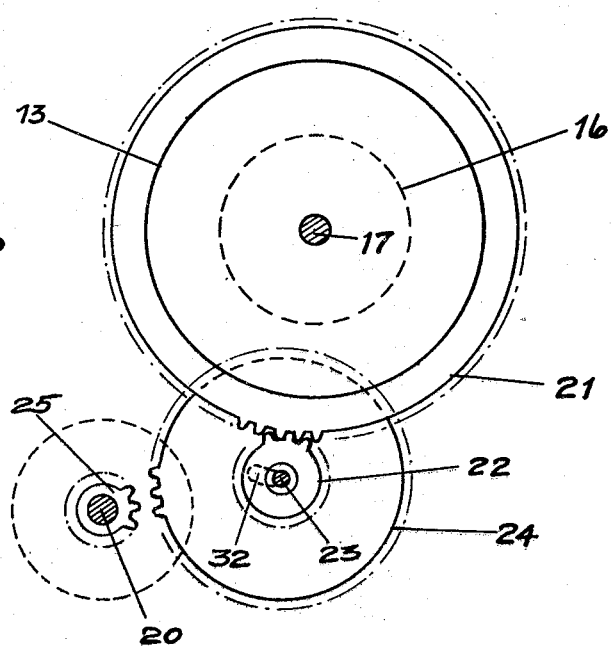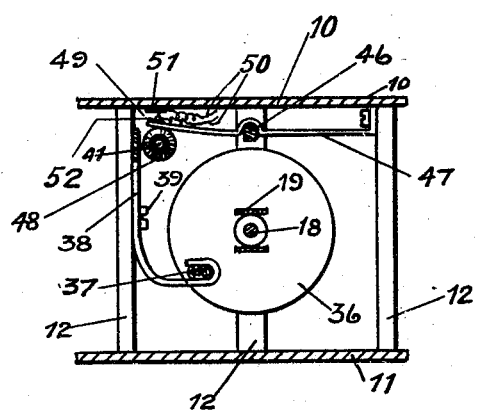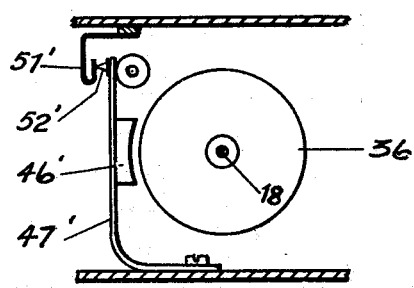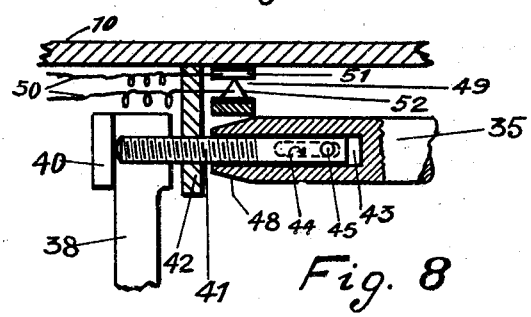

Patented Nov. 18, 1930

1,781,679

UNITED STATES PATENT OFFICE

RICHARD BRENCHLEY, OF REIMS, FRANCE, ASSIGNOR, BY MESNE ASSIGNMENTS, TO DUAL MOTORS LTD., OF LONDON, ENGLAND

PHONOGRAPH

Application filed January 4, 1927, Serial No. 158,878, and in France January 14, 1926.

This invention relates to phonographs and more especially to portable phonographs, and aims to provide an improved driving mechanism for the turntable of such a machine.

The advantages of an electric drive over a spring drive, in the matter of convenience, are recognized, but an electric drive alone is not satisfactory on portable phonographs for, although such machines are frequently used where a source of electricity is available, they must at other times be used where electricity cannot be had.

An important feature of the present invention consists in providing a combined electric and spring drive for the turntable of a phonograph. In accordance with the invention, a spring motor and an electric motor are both connected to a single shaft or spindle on which the turntable may be mounted. The electric motor is small, and is permanently connected to the spindle, since its rotation during the operation of the spring motor causes no inconvenience. The spring motor, on the other hand, is detachably connected with the spindle, and a feature of the invention consists in providing automatic means for disconnecting it from the spindle when the electric motor is in operation, and connecting it to the spindle when the spring motor is in operation and the electric motor is not.

A feature of the invention consists in providing a combined electric and spring drive which is of simple and compact construction, and involves the use of no mechanism in addition to that ordinarily used in a spring driven mechanical motor.

A further feature of the invention consists in providing a single handle controlling both the electric and the mechanical motors, so that the same manipulations of the handle which serve to stop, start and regulate the machine when mechanically driven, serve also to control the machine in the same manner when electrically driven.

These and other features and advantages of the invention may best be understood by a detailed description of the specific embodiment of the invention shown in the accompanying drawings, in which:

Fig. 4 indicating the position of this shaft when the spring motor is connected to the spindle, and Fig. 5, its position when the spindle is disconnected from the spring motor;

Fig. 6 is a fragmentary plan view, similar to Fig. 1, but showing the turntable spindle disconnected from the spring motor;

Fig. 7 is a partial end elevation, sectioned on the line 7—7 of Fig. 2, showing the regulating mechanism, with the support for the regulating screw omitted;

Fig. 8 is an enlarged fragmentary vertical section on line 8—8 of Fig. 1; and

Fig. 9 is a similar view, with parts omitted, showing a modified form of regulating mechanism.

Figure 1:
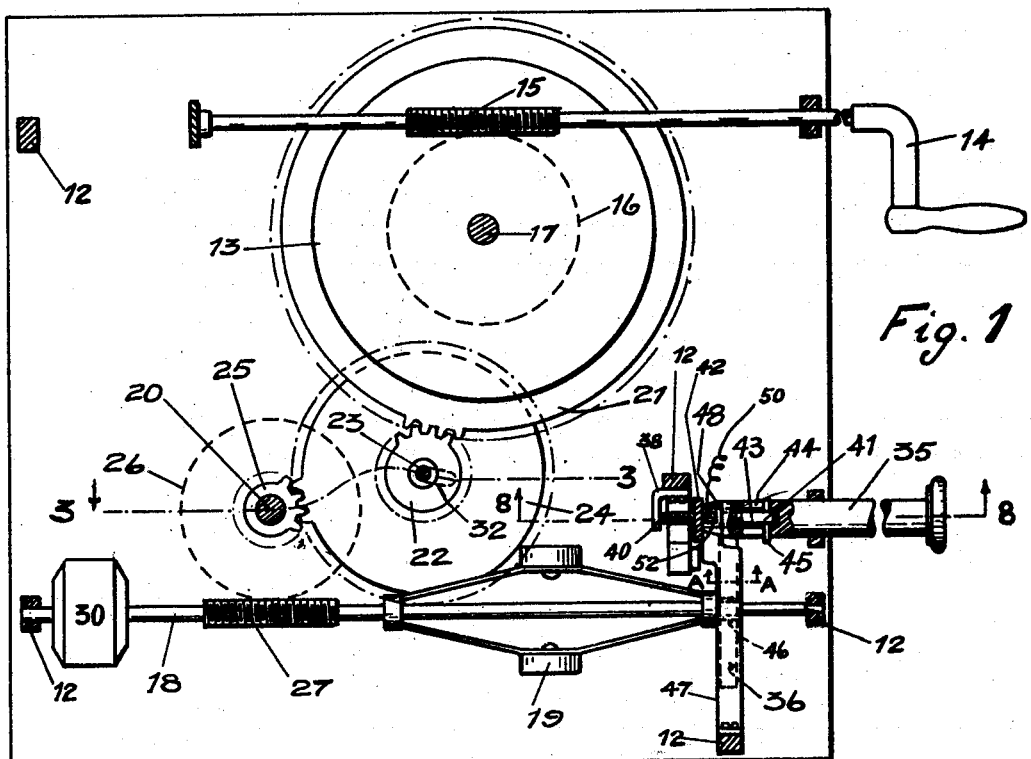
Fig. 1 is a plan view of the driving and regulating mechanism, sectioned on the line 1—1 of Fig. 2, showing the spring motor connected to the turntable spindle.

The driving mechanism shown in the drawings contains the parts customarily used in a mechanical phonograph motor. These include a framework consisting of top and bottom plates 10, 11 connected by cross-pieces 12; a spring drum 13, with a handle 14 connected through a worm 15 and gear 16 to the spring shaft 17 for winding up the spring contained in the drum; speed-increasing mechanism connecting the drum 13 with the shaft 18 of a governor 19; and the turntable shaft or spindle 20, which is an intermediate element in this mechanism. The speed-increasing mechanism, referred to, includes a gear 21 fixed on the drum 13, a pinion 22 meshing with this gear and fixed on an intermediate shaft 23, a gear 24 fixed on the shaft 23 and adapted to mesh with a pinion 25 fixed on the turntable spindle 20, and a gear 26 on the spindle 20 meshing with a worm 27 on the governor shaft 18.

In order to provide for driving the turntable spindle 20 electrically without complicating or adding to the mechanism which has been described, a small electric motor 30 is mounted between the plates 10 and 11 with its rotor directly on the governor shaft 18. By this arrangement, the motor is directly and permanently connected with the spindle 20 through appropriate speed-reducing mechanism provided by the worm 27 and the gear 26.

In order to prevent the spring drum from being turned by the electric motor after the spring has been unwound, which would disconnect or break the spring, means are provided for automatically breaking the connection between the spring drum and the spindle 20 when the electric motor is in operation and the spring is unwound, and for automatically re-establishing this connection when the spring drum is in operation and the electric motor is not. In order to accomplish this result, arcuate slots 31, 32 are provided in the upper and lower plates 10, 11 for the ends of the intermediate shaft 23. These slots are concentric with the axis of the spring drum 13, so that movement of the shaft in the slots makes no change in the engagement between the gear 21 and the pinion 22. Such movement of the shaft serves, however, to bring the gear 24 into and out of engagement with the pinion 25 on the spindle 20.

Figure 2:
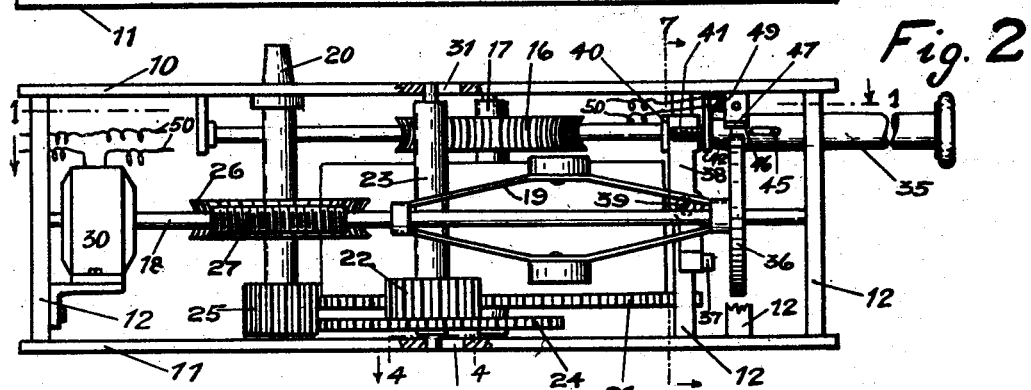
Fig. 2 is a front elevation of the mechanism shown in Fig. 1, also showing the spring motor connected to the spindle.
Figures 3, 4, 5:
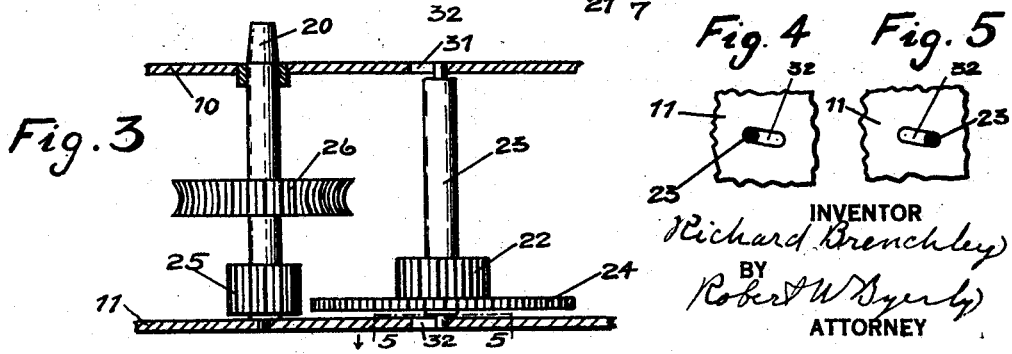
Fig. 3 is a partial front elevation sectioned on the line 3—3 of Fig. 1, showing the spindle disconnected from the spring motor.
Figs. 4 and 5 are fragmentary plan views of the lower plate of the mechanism, showing the slot for the laterally movable intermediate shaft.

When the spring drum has been wound up and is in operation and the electric motor is not, the pressure of the teeth of the gear 21 on those of the pinion 22 holds the shaft 23 at the end of the slots nearest the spindle 20, bringing the gear 24 into engagement with the pinion 25, so that the spring drum drives the spindle. (See Figs. 1, 2 and 4.) When the electric motor is in operation and the spring drum is unwound, and therefore out of operation, the teeth of the gear 21 offer resistance to the teeth of the pinion 22, while this pinion is being driven through the gear 24. Consequently, the pinion 22 rolls along the periphery of the gear 21, moving the ends of the shaft 22 into the ends of the slots 31, 32 furthest from the spindle, thus bringing the gear 24 out of mesh with the pinion 25, and disconnecting the spring drum from the spindle. (See Figs. 3, 5 and 6.)

The combined driving mechanism is provided with a single regulating handle 35 which is used both to control the speed of the turntable spindle and to stop and start the spindle, regardless of whether the spindle is being driven electrically or mechanically. The speed regulation is effected by cooperation between a rotary and slidable disk 36 forming part of the governor 19 and a friction pad 37 carried by a lever 38 which is pivoted at 39. This lever has at its upper end a flange 40 engaged by a regulating screw 41. This screw has a threaded connection with a tapped hole in a supporting flange 42 depending from the upper plate 10. It is apparent that a turning of this screw varies the position in which the friction pad 37 resists the turning of the disk 36, and thus regulates the speed of the turntable spindle 20, regardless of whether the spindle is being driven electrically or mechanically.

In order that the handle 35 may be used to regulate the speed by turning the screw 41, the handle is provided at its inner end with a bore 43 fitting around the screw 41, and with a transverse slot 44 which engages the ends of a transverse pin 45 in the screw, and thus transfers turning movements of the handle to the screw.

The stopping and starting of the spindle 20, when driven by the spring drum 13, is controlled by means of a brake 46 mounted on a resilient strip 47 which normally urges it against the periphery of the disk 36. In and out movements of the handle 35 are utilized to control the brake 46. For this purpose, the handle 35 has a tapered inner end 48. When the handle 35 is pushed in, as shown in the drawings, its tapered end 48 enters under the strip 47, and raises the brake 46 from the disk 36, and permits the spring drum 13 to operate the mechanism. When the handle is pulled out so as to bring its inner end from under the strip 47, the brake 46 comes in contact with the disk 36, and stops the mechanism, when mechanically driven.

When the spindle is electrically driven, the stopping and starting is controlled by a switch 49 in the circuit 50 of the electric motor 30. This switch consists of a fixed contact piece 51 and a movable contact piece 52 carried by the strip 47. When the handle 35 is pushed in to raise the strip 47, the contact piece 52 is brought into contact with the piece 51, closing the motor circuit, while when the handle is pulled out to allow the strip and brake to descend, the contact piece 52 is moved away from the piece 51, breaking the motor circuit. Consequently, precisely the same manipulation of the handle 35 which serves to stop and start the spindle when it is being driven by the spring drum, serves also to stop and start it when it is being driven by the electric motor 30.

In the modification of the control mechanism shown in Fig. 9, the strip 47 extending above the disk 36 is replaced by a strip 47′ located at one side of the disk, and carrying a brake 46′, and the contact pieces 51′, 52′ are correspondingly re-arranged.

It should be clearly understood that the mechanism described is merely an illustrated embodiment of my invention and that the

What I claim is:

1. In a phonograph, the combination of a spring driven drum, an electric motor, a chain of speed increasing gearing connecting the drum with the motor, and a turntable spindle carrying an intermediate gear of said connecting gearing.

2. In a phonograph, the combination of a turntable spindle, an electric motor permanently connected therewith, a spring motor detachably connected therewith, automatic means disconnecting the spindle from the spring motor when the electric motor is in operation and the spring motor is not and connecting the spring motor with the spindle when the spring motor is in operation and the electric motor is not.

3. In a phonograph, the combination of a turntable spindle, an electric motor permanently connected therewith, a spring motor, and means controlled by the relative speeds of the spring motor and spindle for automatically connecting the spring motor with the spindle and disconnecting it therefrom.

4. In a phonograph, the combination of a turntable spindle, an electric motor connected therewith, a spring driven drum, and a chain of gearing between the drum and the spindle, including two gears mounted on a laterally movable shaft.

5. In a phonograph, the combination of a turntable spindle, a pinion fixed thereon, a spring driven gear, a shaft mounted for lateral movement parallel to a portion of the circumference of said gear, a pinion on said shaft engaging said gear, and a gear on said shaft movable into and out of engagement with the pinion on the turntable shaft, and means independent of the spring driven gear for driving the turntable spindle.

6. In a phonograph, a detachable connection between a spring driven gear and a pinion associated with the turntable spindle, comprising a shaft carrying a pinion meshing with the spring driven gear, a support for said shaft having an arcuate slot concentric with the spring driven gear, and a gear on said shaft which meshes with the spindle pinion when the shaft is in one end of said slot and is out of the mesh therewith when the shaft is in the other end of said slot.

7. In a phonograph, the combination of a spring driven drum, a governor, speed increasing mechanism connecting the drum with the governor, a turntable spindle forming an intermediate element of said mechanism, and an electric motor having its rotor on the governor shaft.

8. In a phonograph, the combination with a mechanical motor having a spring driven drum, a governor, and a speed increasing mechanism connecting the drum to the shaft of the governor, of an electric motor having its rotor mounted on the governor shaft.

9. In a phonograph, the combination of a spring driven drum, a governor, speed increasing gearing connecting the drum to the shaft of the governor, a turntable spindle carrying one of the intermediate gears of said gearing, an electric motor having its rotor fixed on the governor shaft, and means for breaking the connection between the spring-driven drum and the spindle when the electric motor is in operation.

10. In a phonograph, the combination of a turntable spindle, an electric motor and a spring motor connected to the spindle so that it is driven when either motor is in operation, a brake for stopping the rotation of the spindle, a switch in the motor circuit, and a single controlling member so connected to the brake and switch that when placed in one position it applies the brake and opens the switch, and when placed in another position it releases the brake and closes the switch.

11. In a phonograph, the combination with a mechanical motor including a governor and a controlling member arranged to regulate the speed of the governor by a turning movement and to apply and release a brake by an in-and-out movement, of an electric motor connected with said mechanical motor, and a switch controlling the circuit of said motor and so arranged that it is opened when said controlling member is moved to apply the brake and is closed when said controlling member is moved to release the brake.

12. In a phonograph, the combination with a turntable spindle, of an electric motor and a spring motor, a permanent positive speed reducing driving connection between the electric motor and the spindle, a driving connection between the spring motor and the spindle, and a speed governor directly attached to the electric motor and serving to control the speed of the turntable spindle, both when it is driven by the electric motor and when it is driven by the spring motor.

13. In a phonograph, the combination with a spring driven turntable spindle, of an electric motor, a worm fixed on the shaft of the electric motor, and a gear meshing with said worm and fixed on the turntable spindle.

In testimony whereof I have hereunto set my hand.

RICHARD BRENCHLEY.